US012659007B2

(12) United States Patent
Saab et al.

(10) Patent No.: US 12,659,007 B2
(45) Date of Patent: Jun. 16, 2026

(54) POSITIONING BASED SYSTEM DESIGN FOR SMART REPEATERS WITH ADAPTIVE BEAMFORMING CAPABILITIES

(71) Applicant: Samsung Electronics Co., Ltd., Suwon-si (KR)

(72) Inventors: Sandy Saab, Plano, TX (US); Shadi Abu-Surra, Plano, TX (US); Gang Xu, Allen, TX (US); Jianzhong Zhang, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 18/474,152

(22) Filed: Sep. 25, 2023

(65) Prior Publication Data

US 2024/0120984 A1     Apr. 11, 2024

Related U.S. Application Data

(60) Provisional application No. 63/414,295, filed on Oct. 7, 2022.

(51) Int. Cl.
| | |
|---|---|
| *H04B 7/06* | (2006.01) |
| *H04B 7/155* | (2006.01) |
| *H04W 64/00* | (2009.01) |

(52) U.S. Cl.
CPC ..... *H04B 7/06952* (2023.05); *H04B 7/15507* (2013.01); *H04W 64/00* (2013.01)

(58) Field of Classification Search
CPC ............ H04B 7/06952; H04B 7/15507; H04B 7/0617; H04B 7/0695; H04B 7/088; H04W 64/00

See application file for complete search history.

(56) References Cited

U.S. PATENT DOCUMENTS

| | | | |
|---|---|---|---|
| 10,299,068 B2 | 5/2019 | McMullen et al. | |
| 10,667,144 B2 * | 5/2020 | Xu ........................ | H04W 64/00 |

(Continued)

FOREIGN PATENT DOCUMENTS

| | | |
|---|---|---|
| WO | 2023025888 A2 | 3/2023 |

OTHER PUBLICATIONS

Tataria et al., "6G Wireless Systems: Vision, Requirements, Challenges, Insights, and Opportunities", Proceedings of the IEEE, vol. 109, No. 7, Jul. 2021, pp. 1166-1199.

(Continued)

*Primary Examiner* — Kenneth T Lam

(57) ABSTRACT

A method for positioning based system design for smart repeaters with adaptive beamforming capabilities is implemented by an electronic device. In certain embodiments, the electronic device is a smart repeater. The method includes obtaining user equipment (UE) location information indicating a location of a UE. The method includes translating, based on a prediction engine, the UE location information to a beam index associated with a beam to serve the UE at the location of the UE. The method includes receiving, from an external communication device via a first wireless communication channel, traffic intended for the UE. The method includes forward-transmitting, via a second wireless communication channel, the traffic via the beam formed at a transmit (TX) antenna of the electronic device.

20 Claims, 8 Drawing Sheets

(56)                    References Cited

U.S. PATENT DOCUMENTS

| | | | | |
|---|---|---|---|---|
| 11,223,411 | B2 | 1/2022 | Abedini et al. | |
| 11,252,646 | B1 | 2/2022 | Marupaduga | |
| 11,375,527 | B1 * | 6/2022 | Eyuboglu | H04B 7/15528 |
| 11,497,050 | B2 | 11/2022 | Black et al. | |
| 11,677,454 | B2 * | 6/2023 | Pezeshki | H04B 7/0695 370/329 |
| 2020/0212994 | A1 * | 7/2020 | Ashworth | H04B 7/15542 |
| 2020/0274609 | A1 * | 8/2020 | Youtz | H04W 16/26 |
| 2021/0091842 | A1 * | 3/2021 | Lagerqvist | H04W 16/28 |
| 2021/0092584 | A1 | 3/2021 | Zou et al. | |
| 2021/0297142 | A1 | 9/2021 | Li et al. | |
| 2021/0376912 | A1 | 12/2021 | Black et al. | |
| 2022/0060854 | A1 * | 2/2022 | Liu | H04B 7/0695 |
| 2022/0069893 | A1 | 3/2022 | Abedini et al. | |
| 2023/0035010 | A1 * | 2/2023 | Kalkunte | G01S 13/825 |
| 2023/0130003 | A1 | 4/2023 | Ali et al. | |
| 2023/0362641 | A1 * | 11/2023 | Edge | H04W 12/06 |
| 2024/0007148 | A1 * | 1/2024 | Ellenbeck | H04B 7/06952 |
| 2024/0030994 | A1 * | 1/2024 | Zhao | H04W 36/322 |
| 2024/0129883 | A1 * | 4/2024 | Manolakos | H04L 5/0073 |
| 2024/0356625 | A1 * | 10/2024 | Walker | H04B 7/15528 |
| 2024/0421887 | A1 * | 12/2024 | Fryking | H04B 7/0695 |
| 2025/0202565 | A1 * | 6/2025 | Nilsson | H04B 7/06952 |
| 2025/0386318 | A1 * | 12/2025 | Ur Rehman | H04B 7/06952 |

OTHER PUBLICATIONS

Naqvi et al., "Achieving 5G NR mmWave Indoor Coverage Under Integrated Access Backhaul", IEEE Systems Journal, vol. 15, No. 4, Dec. 2021, pp. 5429-5439.

Flamini et al., "Towards a Heterogeneous Smart Electromagnetic Environment for Millimeter-Wave Communications: An Industrial Viewpoint", IEEE Transactions on Antennas and Propagation, vol. 70, No. 10, Oct. 2022, 12 pages.

Xu et al., "A New Indoor Positioning System Architecture Using GPS Signals", Sensors, vol. 15, No. 5, Apr. 2015, pp. 10074-10087.

Uzun et al., "A Novel GNSS Repeater Architecture for Indoor Positioning Systems in ISM Band", 2020 IEEE International Symposium on Antennas and Propagation and North American Radio Science Meeting, Jul. 2020, pp. 1631-1632.

Saab et al., "A Standalone RFID Indoor Positioning System Using Passive Tags", IEEE Transactions on Industrial Electronics, vol. 58, No. 5, May 2011, pp. 1961-1970.

Uzun et al., "Indoor Positioning System Based on Global Positioning System Signals with Down- and Up-Converters in 433 MHz ISM Band", Sensors, vol. 21(13), 4338, Jun. 2021, 23 pages.

Steeg et al., "3D Radar Localization via Photonic Chirp Leaky-Wave Antenna Beam Scanning", 2019 International Topical Meeting on Microwave Photonics (MWP), Oct. 2019, 4 pages.

Pöpperl et al., "A novel UWB chirp sequence radar signal processing concept for chipless RFID based vehicle localization", 2017 IEEE Mtt-S International Conference on Microwaves for Intelligent Mobility (ICMIM), Mar. 2017, pp. 123-126.

Hoeflinger et al., "Passive Indoor-Localization using Echoes of Ultrasound Signals", 2019 International Conference on Advanced Information Technologies (ICAIT), Nov. 2019, pp. 60-65.

Chawathe, "Indoor Localization Using Bluetooth-LE Beacons", 2018 9th IEEE Annual Ubiquitous Computing, Electronics & Mobile Communication Conference (UEMCON), Nov. 2018, pp. 262-268.

Sanpechuda et al., "A review of RFID localization: Applications and techniques", 2008 5th International Conference on Electrical Engineering/Electronics, Computer, Telecommunications and Information Technology, May 2008, pp. 769-772.

Özsoy et al., "2D Indoor positioning system using GPS signals", 2010 International Conference on Indoor Positioning and Indoor Navigation, Sep. 2010, 6 pages.

International Search Report and Written Opinion issued Jan. 11, 2024 regarding International Application No. PCT/KR2023/015323, 9 pages.

* cited by examiner

POSITIONING BASED SYSTEM DESIGN FOR SMART REPEATERS WITH ADAPTIVE BEAMFORMING CAPABILITIES

CROSS-REFERENCE TO RELATED APPLICATION AND CLAIM OF PRIORITY

This application claims priority under 35 U.S.C. § 119(e) to U.S. Provisional Patent Application No. 63/414,295 filed on Oct. 7, 2022. The above-identified provisional patent application is hereby incorporated by reference in its entirety.

TECHNICAL FIELD

This disclosure relates generally to wireless communication systems. More specifically, this disclosure relates to positioning based system design for smart repeaters with adaptive beamforming capabilities.

BACKGROUND

Realizing peak data rates in future wireless technologies is very challenging as applications will need to access more spectrum. Accomplishing such speeds requires the design of stable systems with large bandwidths at higher frequencies such as the mmWave frequency bands. The mmWave spectrum is attractive because it accommodates antenna arrays with high gains and precise beamforming capabilities. At mmWave frequencies, however, the signal propagating from an outdoor to an indoor environment suffers significant attenuation and blockage. Coverage limitations at mmWave frequencies is due to higher free space path loss and sensitivity to obstacles (such as human body, building walls, etc.).

SUMMARY

This disclosure provides positioning based system design for smart repeaters with adaptive beamforming capabilities.

In one embodiment, a method for selecting a beam transmitted by smart repeater based on UE location] is provided. The method includes obtaining user equipment (UE) location information indicating a location of a UE. The method includes translating, based on a prediction engine, the UE location information to a beam index associated with a beam to serve the UE at the location of the UE. The method includes receiving, from an external communication device via a first wireless communication channel, traffic intended for the UE. The method includes forward-transmitting, via a second wireless communication channel, the traffic via the beam formed at a transmit (TX) antenna of the electronic device.

In another embodiment, an electronic device for selecting a beam transmitted by smart repeater based on UE location is provided. The electronic device includes a transceiver and a processor operably connected to the transceiver. The processor is configured to obtain user equipment (UE) location information indicating a location of a UE. The processor is configured to translate, based on a prediction engine, the UE location information to a beam index associated with a beam to serve the UE at the location of the UE. The processor is configured to receive, from an external communication device via a first wireless communication channel, traffic intended for the UE. The processor is configured to forward-transmit, via a second wireless communication channel, the traffic via the beam formed at a transmit (TX) antenna of the electronic device.

In yet another embodiment, a non-transitory computer readable medium comprising program code for selecting a beam transmitted by smart repeater based on UE location is provided. The computer program includes computer readable program code that, when executed by a processor of an electronic device, causes the electronic device to obtain user equipment (UE) location information indicating a location of a UE. The computer readable program code causes the electronic device to translate, based on a prediction engine, the UE location information to a beam index associated with a beam to serve the UE at the location of the UE. The computer readable program code causes the electronic device to receive, by a transceiver, from an external communication device via a first wireless communication channel, traffic intended for the UE. The computer readable program code causes the electronic device to forward-transmit, by the transceiver, via a second wireless communication channel, the traffic via the beam formed at a transmit (TX) antenna of the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
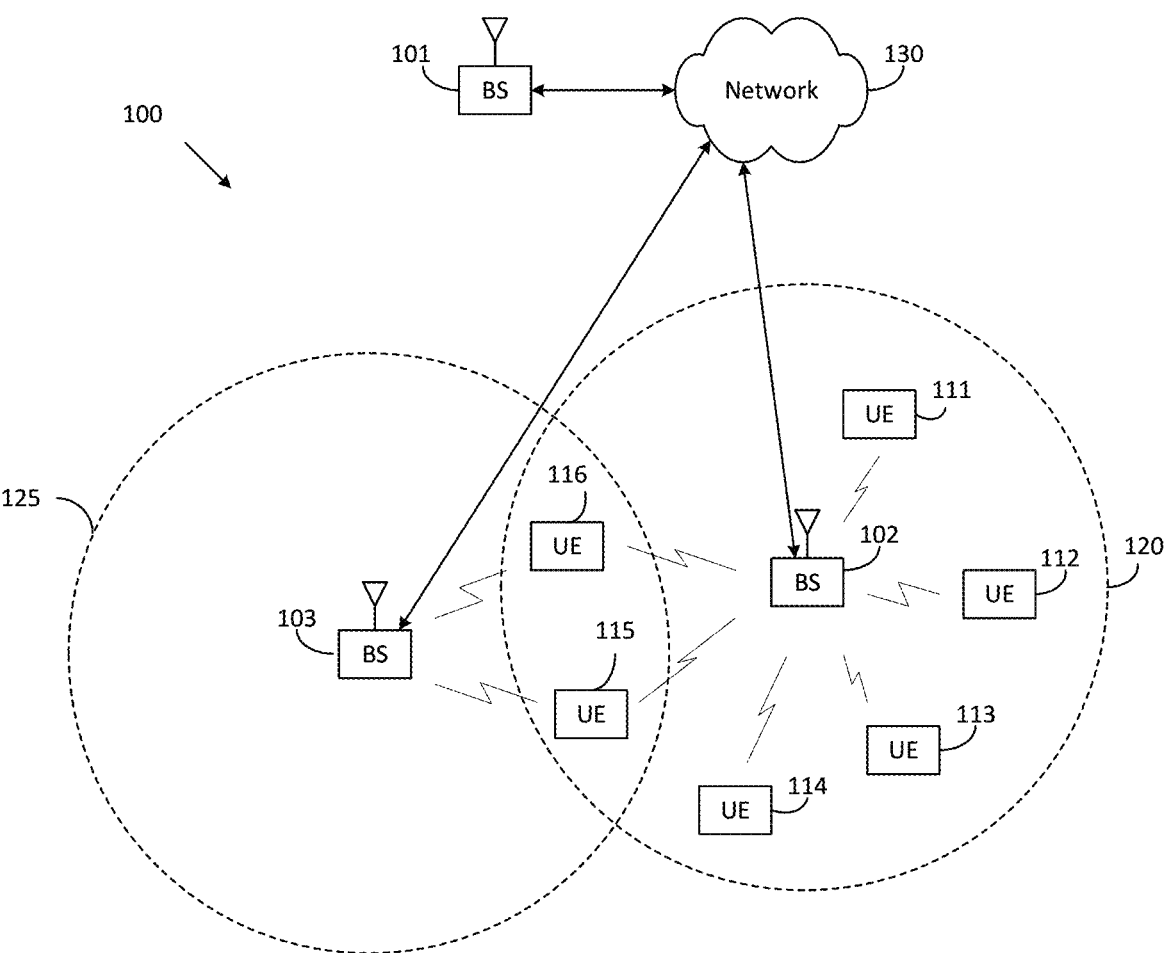
FIG. 1 illustrates an example wireless network according to this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system or device.

As introduced above, coverage limitations at mmWave frequencies is due to higher free space path loss and sensitivity to obstacles (such as human body, building walls, etc.). One approach to address such coverage limitations is by resorting to high gain and narrow beamforming antenna arrays associated with high transmit power. Such high gain and narrow beamforming antenna arrays reduce coverage limitations in near line-of-sight (LoS) scenarios. However, in non-LoS conditions, network densification and additional network nodes (i.e. deployment of more base stations), use of reconfigurable intelligent surfaces (RISs), and deployment of smart repeaters, are approaches that would enhance the performance of the overall system.

In this disclosure, the focus is on relaying the signal from an outdoor setting (e.g., environment) to an indoor setting at mmWave frequencies without connection quality deterioration. To maintain a good signal strength level indoors, embodiments of this disclosure establish adaptive beamforming capabilities from a static smart repeater. To ensure adaptive beamforming quality, embodiments of this disclosure utilize a predictive user position estimation model. Such capabilities enable an improved indoor communication system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
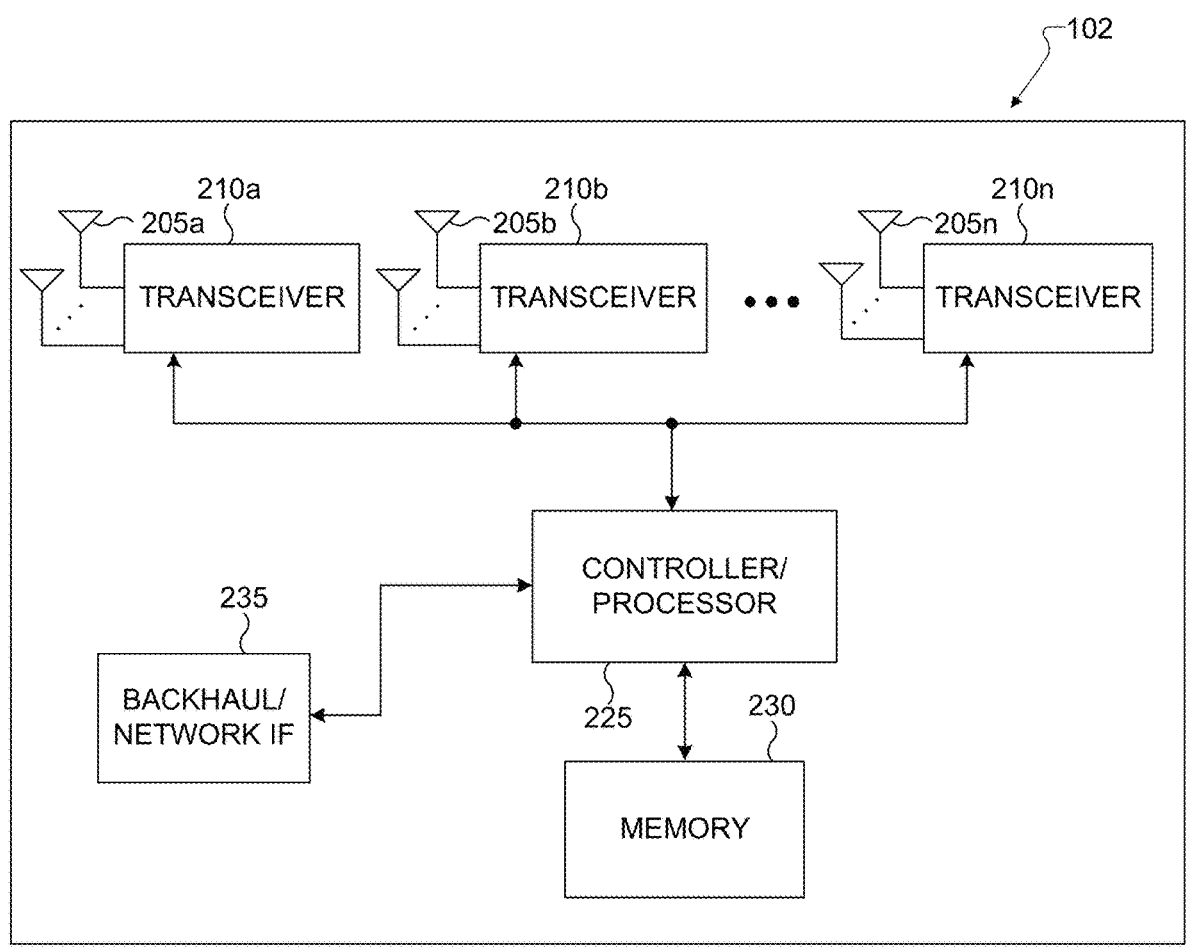
FIG. 2 illustrates an example gNodeB (gNB) according to this disclosure.
Figure 3:
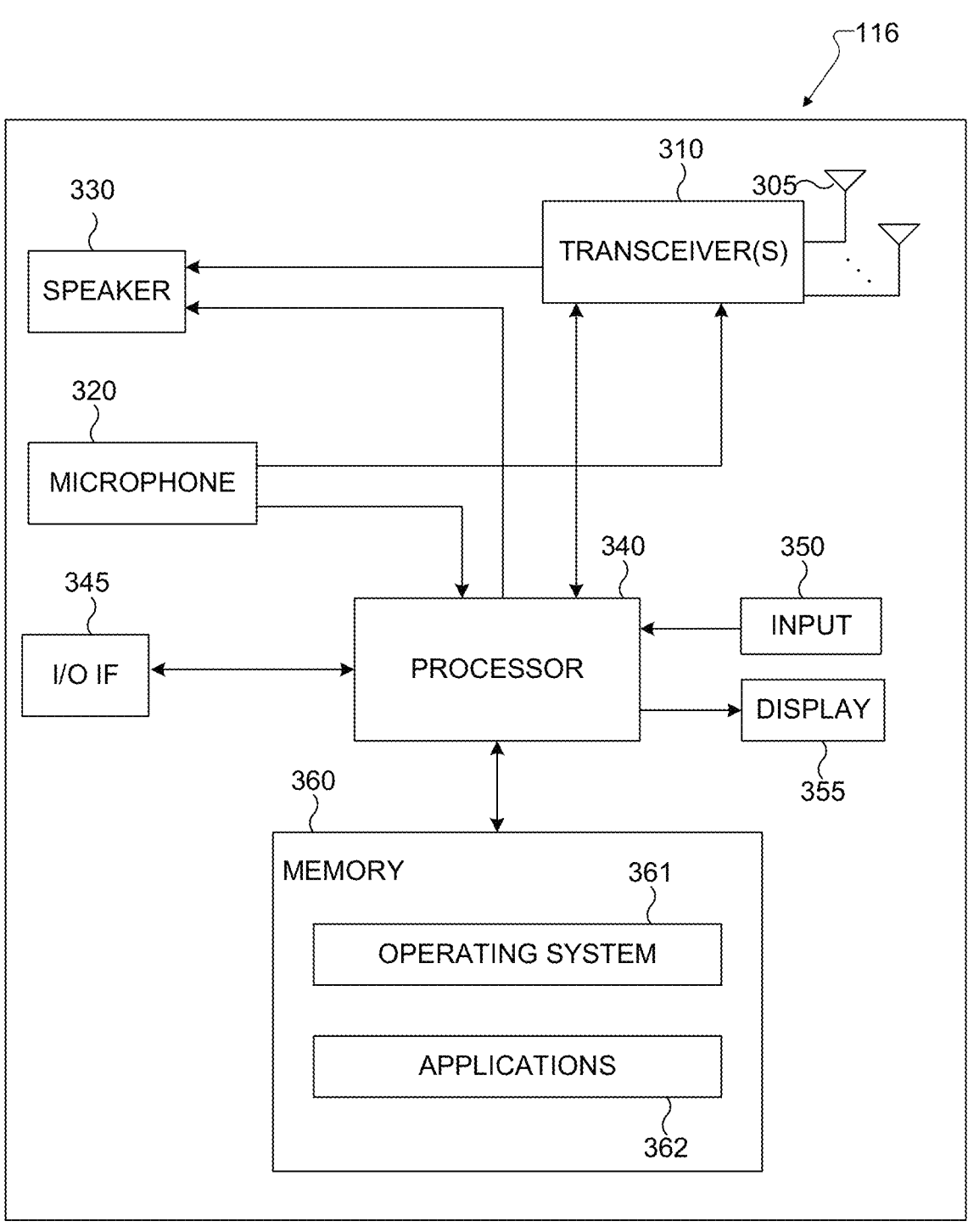
FIG. 3 illustrates an example user equipment (UE) according to this disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), WiFi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, embodiments of this disclosure include a method for selecting a beam transmitted by smart repeater based on UE location, and this method is performed by one or more components within the wireless network 100.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-convert the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

As described in more detail below, embodiments of this disclosure include a method for selecting a beam transmitted by smart repeater based on UE location, and a portion of this method is enabled by transmissions from the gNB 102.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

As described in more detail below, embodiments of this disclosure include a method for selecting a beam transmitted by smart repeater based on UE location, and a portion of this method is enabled by positioning and location determinations performed by the UE 116.

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
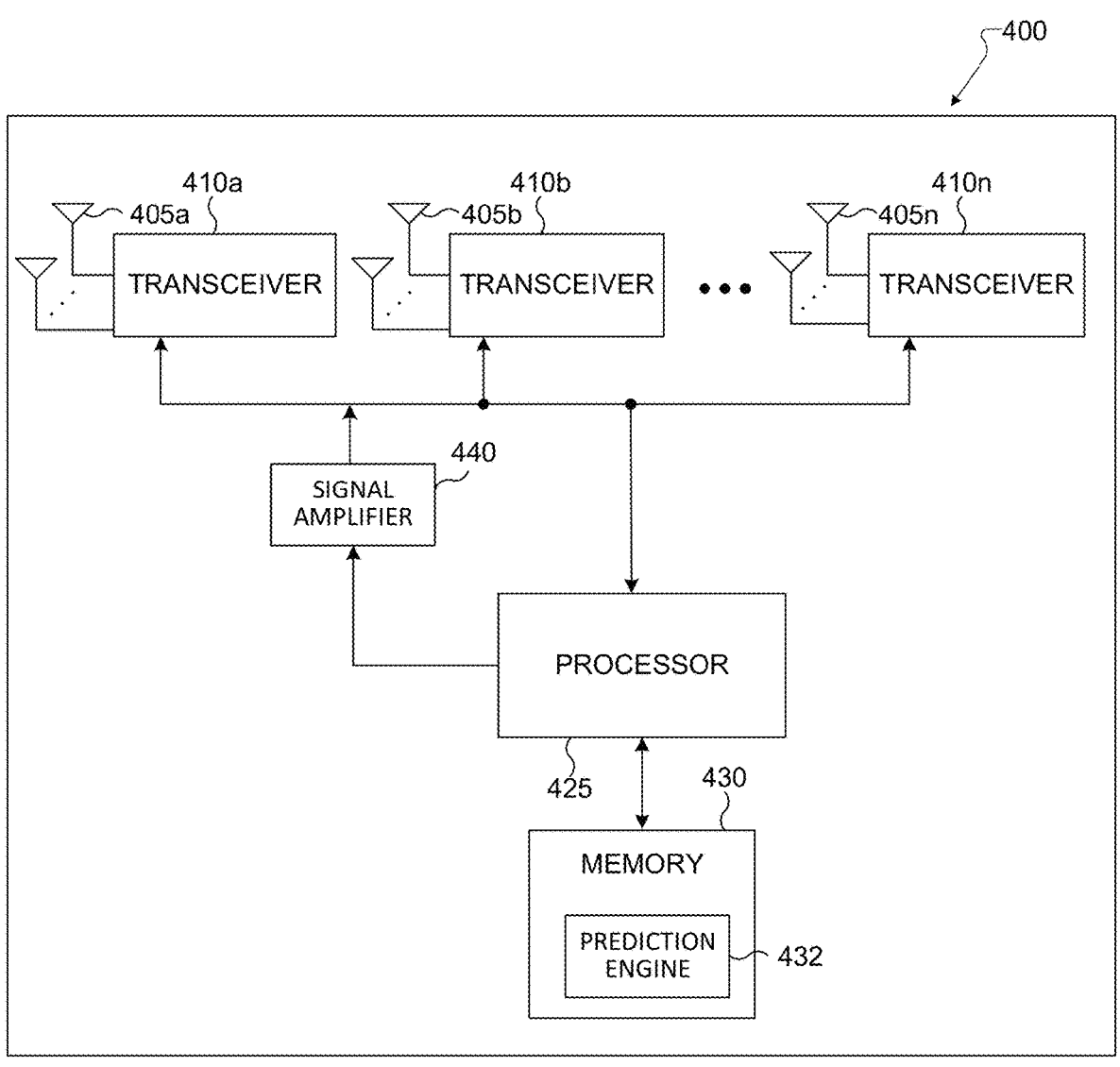
FIG. 4 illustrates an example smart repeater (SR) with adaptive beamforming capabilities according to this disclosure.

FIG. 4 illustrates an example smart repeater (SR) 400 with adaptive beamforming capabilities according to this disclosure. The embodiment of the SR 400 shown in FIG. 4 is for illustration only, and other embodiments could be used without departing from the scope of this disclosure. The installation location of the SR 400 is determined according to a positioning based system design for smart repeaters with adaptive beamforming capabilities, in accordance with embodiments of this disclosure. The installation location of the SR 400 is a physical place where the SR 400 is located and a particular position how the SR 400 is oriented.

The SR 400 provides a solutions to several technical problems that occur in higher frequencies (e.g., higher than sub-6 GHz frequencies; or mmWave frequency bands) uplink and downlink communications between the gNB 102 and one or more UEs 111-116 of FIG. 1. One of these problems is that at mmWave frequencies, signals suffer from severe attenuation due to blockage. One example problem is that signals have higher sensitivity to free space path loss at mmWave frequencies. Some other problems include poor outdoor-to-indoor coverage at mmWave frequencies due to obstacles such as building walls or human beings, etc.; and due to the small wavelength of the mmWave signals, the roughness and imperfections of the surfaces of the obstacles result in a scattering effect that leads to a weaker signal strength. Other problems include coverage limited setting (e.g., indoor setting where UEs are located); area constraints on the array design; or difficulty to redirect the signal internally such that a maintained signal strength is achieved. Another problem is that a conventional repeater, which does not have adaptive beamforming capabilities, simply amplifies and forwards a signal received, which includes amplifying the noise received. The conventional repeater, being a full-duplex node, does not differentiate between uplink and downlink. A specific problem that embodiments of this disclosure solves is determining an optimal use case of a smart repeater operating at mmWave frequencies to provide adaptive beamforming capabilities that results in an improved and enhanced coverage.

An expensive potential solution to address poor outdoor-to-indoor coverage is to deploy more base station towers near each other outside the building, expecting that a beam formed by an outdoor gNB will reach an indoor UE and maintain signal strength and quality. However, 5G data rates might not be maintained in the absence of multi-node base station deployment, because beam training sessions can become complex and too slow. Also, deploying more base station towers does not overcome the problem of obstacles, such as building walls.

The SR 400 of this disclosure overcomes the above-described problems. The SR 400 of this disclosure not only includes repeater capabilities, but also includes adaptive beamforming capabilities. The SR 400 tracks the position or location of one or more UEs, and within the SR 400, adaptive beamforming capabilities make use of the prior knowledge of the UE's position or location. The SR 400 reduces signal processing overhead because finding the position of the UE and relaying the UE's position of the UE to the SR 400 is executes seamlessly over WiFi. The installation location of the SR 400 can be indoors, which can be a cheaper and simpler option than deploying more base station towers that are expensive. The smart repeaters according to this disclosure, such as SR 400, are considered low cost, and are easily deployed. Additional details of the SR 400 are described further below.

As shown in FIG. 4, the SR 400 includes multiple antennas 405a-405n, multiple transceivers 410a-410n, a processor 425, a memory 430, and a signal amplifier 440 to amplify received signals for retransmission to UEs. The transceivers 410a-410n receive, from the antennas 405a-405n, incoming RF signals, such as signals transmitted by gNBs in the network 100. The transceivers 410a-410n down-convert the incoming RF signals to generate IF or baseband signals. The IF or baseband signals are processed by receive (RX) processing circuitry in the transceivers 410a-410n and/or processor 425, which generates processed baseband signals by filtering, decoding, and/or digitizing the baseband or IF signals. The processor 425 may further process the baseband signals.

Transmit (TX) processing circuitry in the transceivers 410a-240n and/or processor 425 receives analog or digital data (such as voice data, web data, e-mail, or interactive video game data) from the processor 425. The TX processing circuitry encodes, multiplexes, and/or digitizes the outgoing baseband data to generate processed baseband or IF signals. The transceivers 410a-410n up-convert the baseband or IF signals to outgoing RF signals. The transceivers 410a-410n transmit, via the antennas 405a-405n, outgoing RF signals, such as signals intended for UEs in the network 100. In some embodiments, one subset of the transceivers 410a-410n (referred to as RX antenna arrays) are configured to receive signals from the gNB 102, another subset of the transceivers 410a-410n (referred to as TX antenna arrays) are configured to transmit using adaptive beamforming, and yet another subset of the transceivers 410a-410n (referred to as WiFi antennas) are configured for receptions and transmission of WiFi signals.

The processor 425 can include one or more processors or other processing devices that control the overall operation of the SR 400. For example, the processor 425 could control the reception of DL channel signals and the forward-transmission of those DL channel signals by the transceivers 410a-410n. As another example, the processor 425 could control the reception of UL channel signals and the forward-transmission of the UL channel signals by the transceivers 410a-410n. The processor 425 could support additional functions as well, such as more advanced wireless communication functions. For instance, the processor 425 could support beam forming or directional routing operations in which outgoing/incoming signals to/from multiple antennas 405a-405n are weighted differently to effectively steer the outgoing signals in a desired direction. Any of a wide variety of other functions could be supported in the SR 400 by the processor 425.

The processor 425 is also capable of executing programs and other processes resident in the memory 430, such as an OS. The processor 425 can move data into or out of the memory 430 as required by an executing process.

The memory 430 is coupled to the processor 425. Part of the memory 430 could include a RAM, and another part of the memory 430 could include a Flash memory or other ROM. In accordance with embodiments of this disclosure, the memory 430 can include a prediction engine 432.

The SR 400 provides adaptive beamforming capabilities when the location of the UE is known. One function of the SR 400 is obtaining the location of a UE. Finding the location of the UE requires positioning or localization technologies, such as GPS with GNSS repeaters or through the use of radar, ultrasound, Bluetooth, or RFID. In a particular example, GPS and GNSS repeaters can find the location of the UE indoors. GPS signals suffer from path-loss when trying to find the location of a UE indoors, so the GNSS repeaters are used in the indoors environment to help identify a more precise location of the UE with sub-meter accuracy. That is, the positioning accuracy based on the GNSS repeater signals is more accurate than the positioning accuracy based on the GPS signals without the GNSS repeater. A lower free space path loss can result from using satellite frequencies or mounting additional hardware on the SR 400 and on the UE to down-convert and up-convert frequencies, particularly, converting from a GPS frequency (1575.42 MHz or other satellite frequency) to the ISM band (433 MHz). Other positioning or localization technologies can be used, including radar chirp transmission or ultra-sound. For short range transmission, the location of the UE can be determined through Bluetooth and/or RFID technology.

Once the location of the UE is established, the location of the UE is sent to the SR 400, for example, over WiFi signals. As soon as this UE location information is received by the SR 400, the predictive engine 432 (such as an Artificial Intelligence (AI) engine) is used to select the proper beam and translate the location of the UE to beam index. As a result, the SR 400 identifies the traffic transmitted via a wireless communication channel and directs the selected beam in the proper direction at a certain time to achieve adaptive beamforming capabilities. That is, the SR 400 with the predictive engine 432 performs selection of a proper beam to enhance the coverage and system performance.

Although FIG. 4 illustrates one example smart repeater 400, various changes may be made to FIG. 4. For example, various components in FIG. 4 could be combined, further subdivided, or omitted and additional components could be added according to particular needs. As a particular example, the processor 425 could be divided into multiple processors, such as one or more central processing units (CPUs). In another example, the transceiver(s) 410 may include any number of transceivers and signal processing chains and may be connected to any number of antennas. In another example, the prediction engine 432 is a smart repeater-based prediction engine that enables the SR 400 to upload data to a server that includes a server-based prediction engine. The server-based prediction engine executes the above-described functions of the prediction engine 432 to process the uploaded data, and that returns results from processing the uploaded data back to the smart repeater-based prediction engine, for example, by pushing the results to the prediction engine 432.

Figure 5:
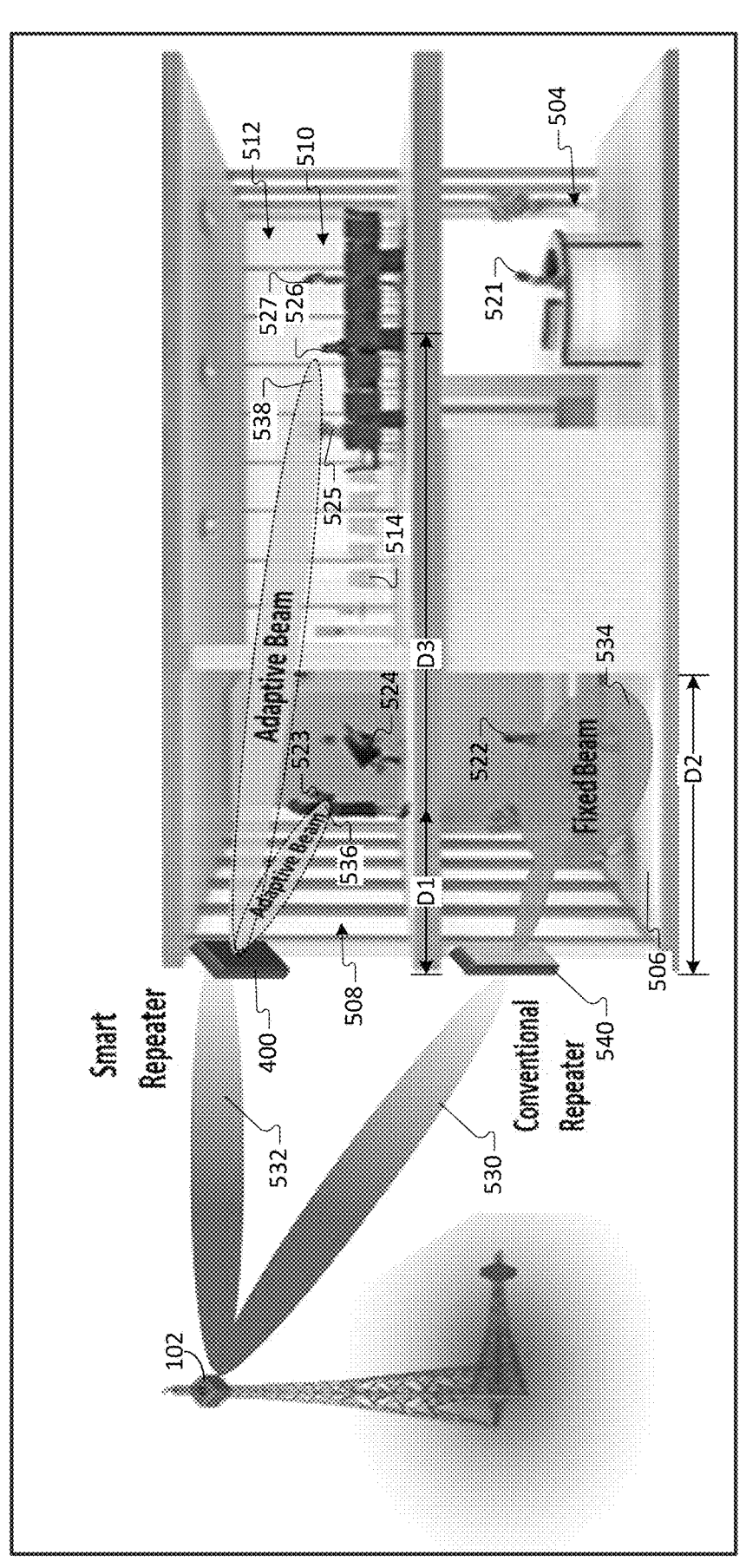
FIG. 5 illustrates an example scenario of a smart repeater utilizing adaptive beamforming to aid wireless communication between a gNB and a UE in an indoor environment, according to this disclosure.

FIG. 5 illustrates an example scenario 500 of a smart repeater utilizing adaptive beamforming to aid wireless communication between a gNB and a UE in an indoor environment, according to this disclosure. The embodiment of the scenario 500 shown in FIG. 5 is for illustration only, and other embodiments could be used without departing from the scope of this disclosure.

To avoid duplicative descriptions, some of the features (e.g., gNB 102, and coverage area 120) of the wireless network 100 of FIG. 1 and SR 400 of FIG. 4 are also included in the scenario 500 of FIG. 5. In this scenario 500, a building 502 is located inside the coverage area 120 of the gNB 102. The building 502 includes floors, exterior walls, interior walls, and a roof. The building 502 includes multiple levels (e.g., stories), and each level can include one or more rooms. For example, the first level of the building 502 can be at ground level, including a first room that is referred to as a foyer 504, a second room that is referred to as a creative room 506. A second level of the building 502 can be an upper level above the first level, including a third room that is referred to as an office 508, a fourth room that is referred to as a meeting room 510, and a fifth room that is referred to as a dining hall 512. A glass interior wall divides the meeting room 510 (shown in the foreground) from the dining hall 512 (shown in the background). At the instant shown in the scenario, the chairs 514 inside the dining hall 512 are empty, as no person is currently present in that room.

Multiple UEs 521-527 are located in an indoors environment that the building 502 provides, and each of the UEs 521-527 of FIG. 5 can be the same as or represent the UEs 111-116 of FIG. 1. For example, a first UE 521 associated with a receptionist is located at the desk in the foyer 504, where people enter and exit the building 502. A second UE 522 is located on the body of a creative worker in the creative room 506. Third and fourth UEs 523 and 524 are located in the office 508 with associated with workers, respectively. Fifth, sixth, and seventh UEs 525, 526, and 527 are located in the meeting room 510 with the people surrounding the conference table.

In this disclosure, areas of the building are referred to as being "indoors," for simplicity, but embodiments of this disclosure are not limited to operating indoors, and can operate in outdoor areas of the building where non-LoS conditions exist relative to the gNB 102. For example, non-LoS conditions exist at a covered patio area under the roof of the building 602, or at an unroofed courtyard area that is surrounded by exterior walls of the building blocking the LoS of the gNB 102.

The gNB 102 transmits a first beam 530 and a second beam 532 to communicate with the UEs 521-527 inside the building 502. In this example, a conventional repeater 540 is mounted to a wall located in the creative room 506, and the SR 400 is mounted to a wall located in the office 508, but could be located at any other suitable location of the building 502 to receive a beam transmitted from the gNB 102. The conventional repeater 540 receives the first beam 530, and the SR 400 receives the second beam 532. The conventional repeater 540 amplifies the signal received via the first beam 530 and transmits the amplified signal via a fixed beam 534. The conventional repeater 540 does not include any UE tracking functionality, and retransmits signals using wide beams to maximize coverage. The fixed beam 534 is a wide beam that spreads across wide area, but the range of the fixed beam 534 has a short radius. For example, the fixed beam 534 may spread across the creative room, but the range of the fixed beam 534 may only reach from the wall on which the repeater 540 is mounted to another wall on an opposite side of the creative room 506. The conventional repeater 540 does not have capabilities to identify that the signal received via the first beam 530 contains traffic intended for a particular UE, but instead amplifies any signal received from the gNB 102. For example, if the first beam 530 contains traffic intended for the first UE 521, then the traffic will not be received by the intended UE because the range of the fixed beam 534 does not extend far enough to reach the location of the first UE 521 in the foyer 504. On the other hand, if the first beam 530 contains traffic intended for the second UE 522, then the traffic will be received by the intended UE because the coverage area of the fixed beam 534 extends far enough to reach the location of the second UE 522 in the creative room 506.

When the traffic intended for the third UE 523 is received via the second beam 532, then the SR 400 transmits (by forwarding) the traffic to the third UE 523 via a first adaptive beam 536 that is selected to reach the location of the UE 523, which is in the office 508. When the traffic intended for the sixth UE 526 is received via the second beam 532, then the SR 400 transmits (by forwarding) the traffic to the sixth UE 526 via a second adaptive beam 538 that is selected to reach the location of the sixth UE 526, which is in the center of the meeting room 510. In this example, the distance D1 from the SR 400 to the location of the third UE 523 is shorter than the range D2 of the fixed beam 534, which is shorter than the distance D3 from the SR 400 distance from first adaptive beam 536. In this example, each of the adaptive beams 536 and 538 is narrow compared to the fixed beam 534. In further comparison, the fixed beam 534 does not necessarily result in an improved indoor network coverage, however, the adaptive beamforming 536 and 538 provided by the SR 400 enables the UEs to receive a better quality signal and a more stable communication link with the gNB 102.

Although FIG. 5 illustrates an example of a scenario 500, various changes may be made to FIG. 5. For example, various components in FIG. 5 could be combined, further subdivided, or omitted and additional components could be added according to particular needs. As a particular example, the SR 400 can include a WiFi device, such as a WiFi router that has a coverage area that includes at least part of the building 502 indoors, such as a coverage area that at least includes the foyer 504. For ease of distinction, the WiFi device incorporated into the SR 400 is referred to as an SR-embedded WiFi router. However, it is understood that the functions of the SR-embedded WiFi router can be performed by an external WiFi router that is communicably coupled to the SR 400, such as the WiFi routers 640 and 640*a*-640*d* of FIGS. 6-7 described further below.

Figure 6:
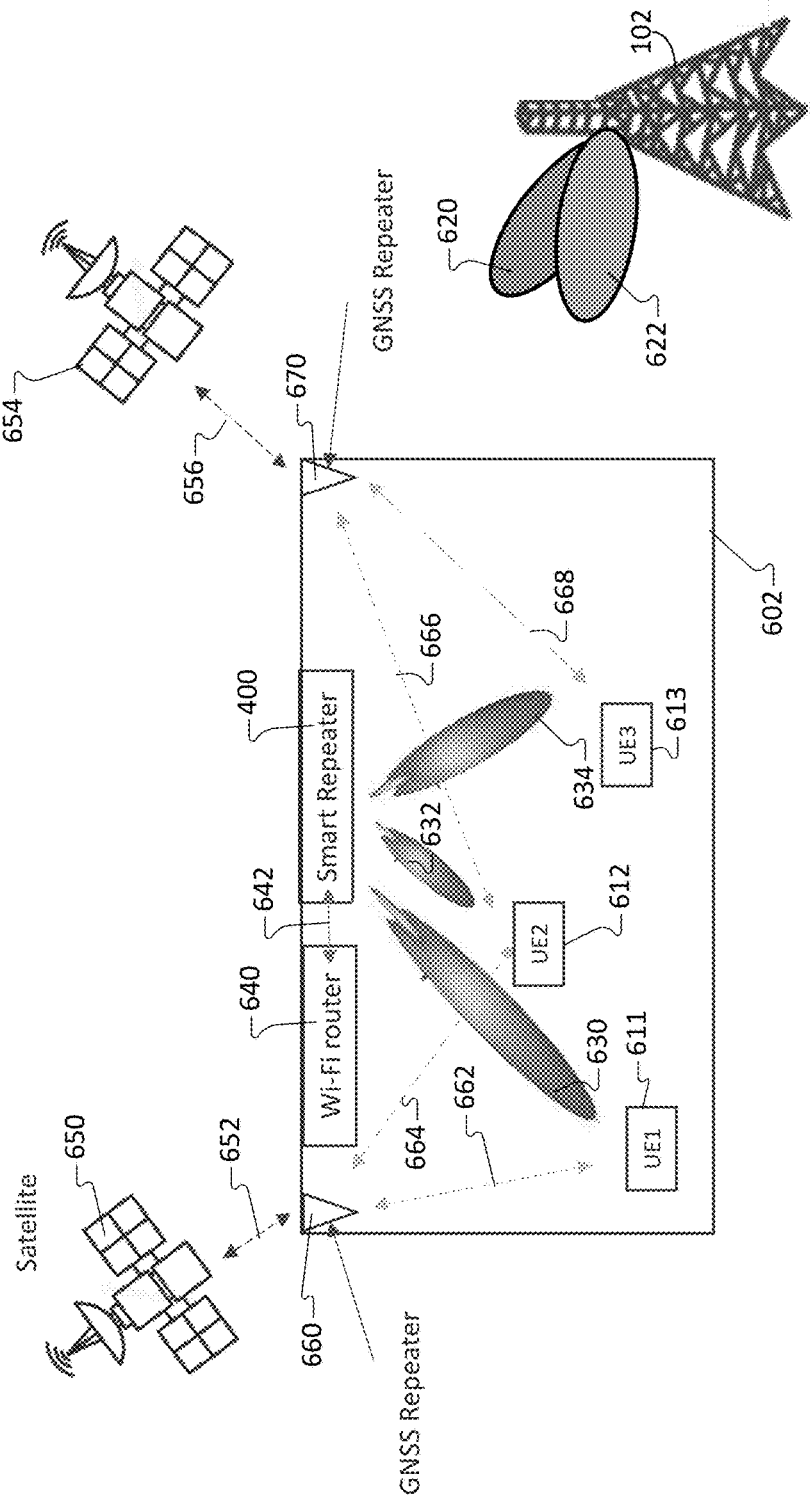
FIG. 6 illustrates an example scenario of determining locations of multiple UEs inside a building, respectively, and relaying UE location information to a smart repeater inside the building according to this disclosure.

FIG. 6 illustrates an example scenario 600 of determining locations of multiple UEs inside a building 602, respectively, and relaying UE location information to a smart repeater 400 inside the building according to this disclosure. The embodiment of the scenario 600 shown in FIG. 6 is for illustration only, and other embodiments could be used without departing from the scope of this disclosure.

To avoid duplicative descriptions, some of the features (e.g., gNB 102, and coverage area 120) of the wireless network 100 of FIG. 1 and SR 400 of FIG. 4 are also included in the scenario 600 of FIG. 6. In this scenario 500, a building 602 is located inside the coverage area 120 of the gNB 102. The building 602 in FIG. 6 can be the same as or similar to the building 502 in FIG. 5. The first UE (UE1) 611, second UE (UE2) 612, and third UE (UE3) 613 of FIG. 6 Multiple UEs 611-613 are located inside an indoors environment that the building 602 provides, and each of the UEs 611-613 of FIG. 6 can be the same as or represent the UEs 111-116 of FIG. 1, or the UEs 521-527 of FIG. 5.

The SR 400 can include two or more RX antennas, including a first RX antenna array that receives a first beam 620 transmitted from the gNB 102, and a second RX antenna array that receives a second beam 622 transmitted from the gNB 102. In certain embodiments, the RX antennas of the SR 400 can receive the first and second beams 620 and 622 concurrently.

The SR 400 includes one or more WiFi antennas, and establishes a WiFi connection 642 to the WiFi router 640 operating inside the building 602. The multiple UEs 611-613 are located in different areas of the building 602. In this example, UE1 611 determines the location of the UE1 611, itself, by using GPS and GNSS technology. Particularly, a first GPS satellite 650 transmits GPS satellite signals 652, which are received by a first GNSS repeater 650. The first GNSS repeater 650 re-radiates the satellite signals to the indoors environment of the building 602. The UE1 611 receives the re-radiated satellite signals 662 and determines the location of the UE1 611 based on the received satellite signals 662. For example, the location of the UE1 611 may be determined as in Texas, in the City of Dallas, inside the In-N-Out restaurant building on LBJ Freeway. The location of the UE1 611, as determined by the UE1 itself, can be transmitted to the WiFi router 640, which transmits UE location information to the SR 400 via the WiFi connection 642. The UE location information indicates the location of the UE.

In certain embodiments, the UE location information that the WiFi router 640 transmits to the SR 400 indicates the location of the UE1 relative to the location of the WiFi router. For example, the UE location information can indicate a distance and an angle from location of the WiFi router 640 to the location of the UE1 611, which are estimated from a reference point of view that is the WiFi router 640. In certain embodiments, the SR 400 uses the prediction engine to translate the UE location information to a different a reference point of view that is the installation location of the SR 400.

Analogously, a second GPS satellite 654 transmits other GPS satellite signals 656, which are received by a second GNSS repeater 670. The second GNSS repeater 670 re-radiates the satellite signals to the indoors environment of the building 602. The UE2 612, using location determination techniques similar to UE1, determines its own location based on receipt of satellite signals 664 re-radiated from the first GNSS repeater 650 and/or receipt of satellite signals 666 re-radiated from a second GNSS repeater 670. The UE3 613 uses a similar method to determine its own location based on receipt of satellite signals 668 re-radiated from the second GNSS repeater 670. In this particular example, the SR 400 receives UE information that indicates the locations of UE1, UE2, and UE3 are first, second, and third areas of the building 602, respectively.

If only the location of the UE1 is indicated, then the SR 400 translates the UE location information to a beam index associated with a beam to serve the UE1 611 at the location of the UEL. In the case when the UE location information indicates the locations of multiple UEs, the SR 400 translates the UE information to multiple corresponding beam indices, respectively. For example, the SR 400 may include a lookup table (LUT) that maps beams indices to a particular area of the building that is indoors. For example, the LUT can map latitude-longitude data (or other GPS-formatted location data) or GNSS-formatted location data to a beam index. For example, a first beam index is mapped to the first adaptive beam 630 that, when beamformed, reaches a first area of the building 602, such as a southwest corner (shown at the bottom-left). A second beam index is mapped to the second adaptive beam 632 that, when beamformed, reaches a second area of the building 602, such as a central area. A third beam index is mapped to the third adaptive beam 634 that, when beamformed, reaches a third area of the building 602, such as a southeast area (shown at the bottom-right).

The SR 400 can include two or more TX antennas. In this example, the SR 400 includes a first TX antenna array that transmits a first adaptive beam 630 to the location of UE1 611, a second TX antenna array that transmits a second adaptive beam 632 to the location of UE2 612, and a third TX antenna array that transmits a third adaptive beam 634 to the location of UE3 613. In certain embodiments, the TX antennas of the SR 400 can transmit the three adaptive beams 630, 632, and 634 concurrently. Each of the adaptive beams 630, 632, 634 is directed in a specified direction and at specified angle.

Figure 7:
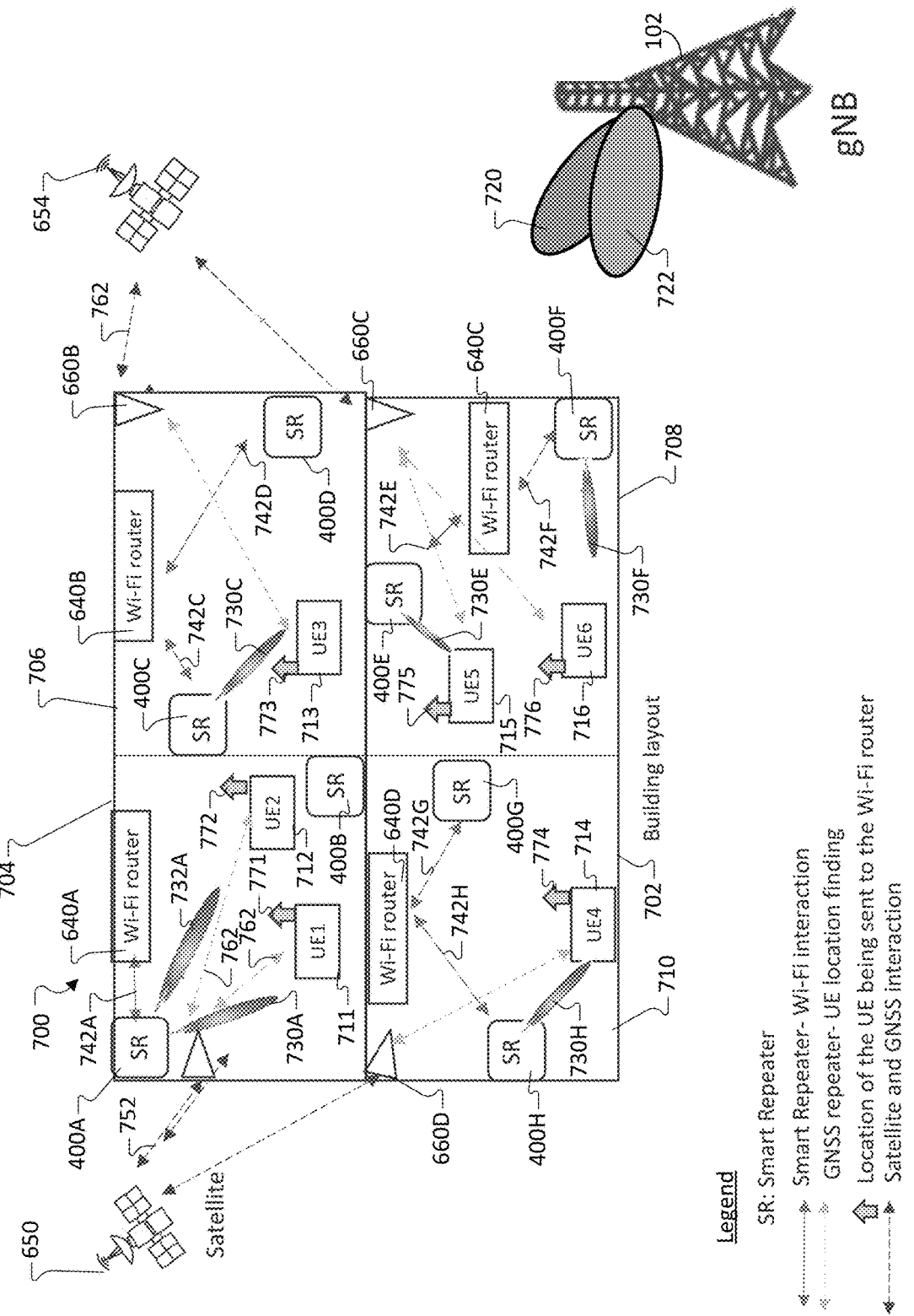
FIG. 7 illustrates an example layout of a building with an optimized number of smart repeaters installed inside the building according to positioning based system design, according to this disclosure.

FIG. 7 illustrates an example layout 700 of a building 702 with an optimized number of smart repeaters installed inside the building according to positioning based system design, according to this disclosure. The embodiment of the layout 700 of the building 702 shown in FIG. 7 is for illustration only, and other embodiments could be used without departing from the scope of this disclosure. The layout 700 is shown as dividing the building 702 into four quadrants, but it is understood that each quadrant represents a different part of the building, such as different levels of a multi-story building, or different wings of wide-spread building. For simplicity, the four quadrants will be referred to as a first through fourth wings 704, 706, 708, 710.

To avoid duplicative descriptions, some of the features (e.g., gNB 102, and coverage area 120) of the wireless network 100 of FIG. 1 are also included in the scenario that includes the layout 700 of FIG. 7. The building 702 is located inside the coverage area 120 of the gNB 102. The building 702 in FIG. 7 can be the same as or similar to the building 502 in FIG. 5, or can be a more detailed view of the building 602 of FIG. 6. Some of the features of the scenario 600 of FIG. 6 are also included in the scenario that includes the layout 700 of FIG. 7, such as the first GPS satellite 650 and the second satellite 654.

There are multiple UEs 711-716 located inside an indoors environment that the building 702 provides, each of which can be the same as or can represent the UEs 111-116 of FIG. 1, or the UEs 521-527 of FIG. 5, or the UEs 611-613 of FIG. 6. In this example, one or more UEs is located in each of the wings 704-710.

There are multiple smart repeaters 400a-400h installed in each of the wings 704-710 at different locations in the building 702. Within each of the wings, the smart repeaters are installed at different locations in order to increase coverage with that wing. Multiple smart repeaters in the same wind can also provide redundant coverage in high traffic areas that, but for the redundancy, would experience network congestion due to a crowd of an increased number of UEs crowded in those high traffic areas. The multiple smart repeaters 400a-400h can be the same as or similar to the SR 400 of FIG. 4. The gNB 102 communicates with multiple UEs 711-716 inside the building 702 by transmitting multiple beams 720-722 toward the building. Although two beams 720-722 are shown, it is understood that gNB 102 can transmit more beams, such as different beams to each of the multiple smart repeaters 400a-400h, respectively.

There are multiple WiFi routers 640a-640d installed in the building 702, such that at least one WiFi router is installed in each of the wings 704-710. In the first wing 704, the first SR 400a establishes a WiFi connection 742a to the first WiFi router 640a, and although the second SR 400b is also capable of establishing a WiFi connection with the WiFi router 640a, the second SR 400b has not currently established such WiFi connection. In each of the other wings 706-710, each of the smart repeaters in that wing establishes a WiFi connection 742c, 742d, 742e, 742f, 742g with the WiFi router 640b, 640c, 640d corresponding to that wing.

Each of the UES 711-716 determines its own location using positioning or localization technologies, for example, a based on the above-described GPS with GNSS repeater technology that is also used by the UE1 611 of FIG. 6. In the layout 700, there are multiple GNSS repeaters 660a, 660b, 660c, 660d installed in the building 702 such that at least one of the GNSS repeaters 660a-660d is installed in each of the wings 704-710, respectively. The first satellite 650 transmits GPS satellite signals 752 that are detected by and re-radiated by the GNSS repeaters 660a and 660d installed the first and fourth wings 704 and 710. The UE1 711 receives the re-radiated satellite signals 762 and determines the location of the UE1 711 based on the received satellite signals 762. Similarly, the second satellite 654 transmits GPS satellite signals 756 that are detected by and re-radiated by the GNSS repeaters 660b and 660c mounted in the second and third wings 706 and 708, respectively.

In the first wing 704, the locations of UE1 and UE2 are transmitted to the first WiFi router 640a via WiFi connections 771 and 772 established with the UE1 711 and UE2 712. Each of the other UEs 713-716, after determining the location of that UE, transmits the determined location via a corresponding WiFi connection 773, 774, 775, 776 to the WiFi router 640b, 640c, 640d installed in the same wing 706-710 as that UE.

In the first wing 704, the first SR 400a translates the UE location information to a first beam index associated with a first beam 730a to serve the UE1 711 at the location of the UE1, and to second beam index associated with a second beam 732a to serve the UE2 712 at the location of the UE2.

In the second wing 706, the third SR 400c and fourth SR 400d both receive the same UE location information via respective WiFi connection s742c and 742d. The third SR 400c determines that the location of the UE3 translates to a beam index stored at the third SR 400c, which beam index is associated with a beam 730c to serve the UE3 713 at the location of the UE3. Thus, when the third SR 400c receives one of the beams 720-722 transmitted from the gNB 102, the third SR 400c forward-transmits traffic intended for the UE3 713 via the beam 730c. The fourth SR 400d determines that the location of the UE3 does not translate to any beam index stored at the fourth SR 400d. For example, the location of the UE3 could be outside of the coverage area of the fourth SR 400d. Thus, if the fourth SR 400d receives one of the beams 720-722 transmitted from the gNB 102, the fourth SR 400d does not forward-transmit traffic intended for the UE3 713. This scenario in the second wing 706 similarly occurs in the fourth wing 710, wherein traffic intended for the UE4 714 is forwarded by the eighth SR 400h via the beam 730h directed to the location of the UE4.

In the third wing 708, the fifth SR 400e and sixth SR 400f both receive the same UE location information via respective WiFi connection s742e and 742f. The fifth SR 400e determines that the location of the UE5 translates to a beam index stored at the fifth SR 400e, and determines that the location of the sixth UE6 does not translate to any beam index stored at the fifth SR 400e. When the fifth SR 400e receives one of the beams 720-722 transmitted from the gNB 102, the fifth SR 400e forward-transmits traffic intended for the UE5 715 via the beam 730e, but does not forward-transmit traffic intended for the UE6 716. The location of the UE6 716 could be outside of the coverage area of the fifth SR 400e. This scenario of the fifth SR 400e similarly occurs in the sixth SR 400f, wherein traffic intended for the UE6 716 is forwarded by the sixth SR 400f via the beam 730*e* directed to the location of the UE6, but the sixth SR 400*f* does not forward-transmit traffic intended for the UE5 715.

Figure 8:
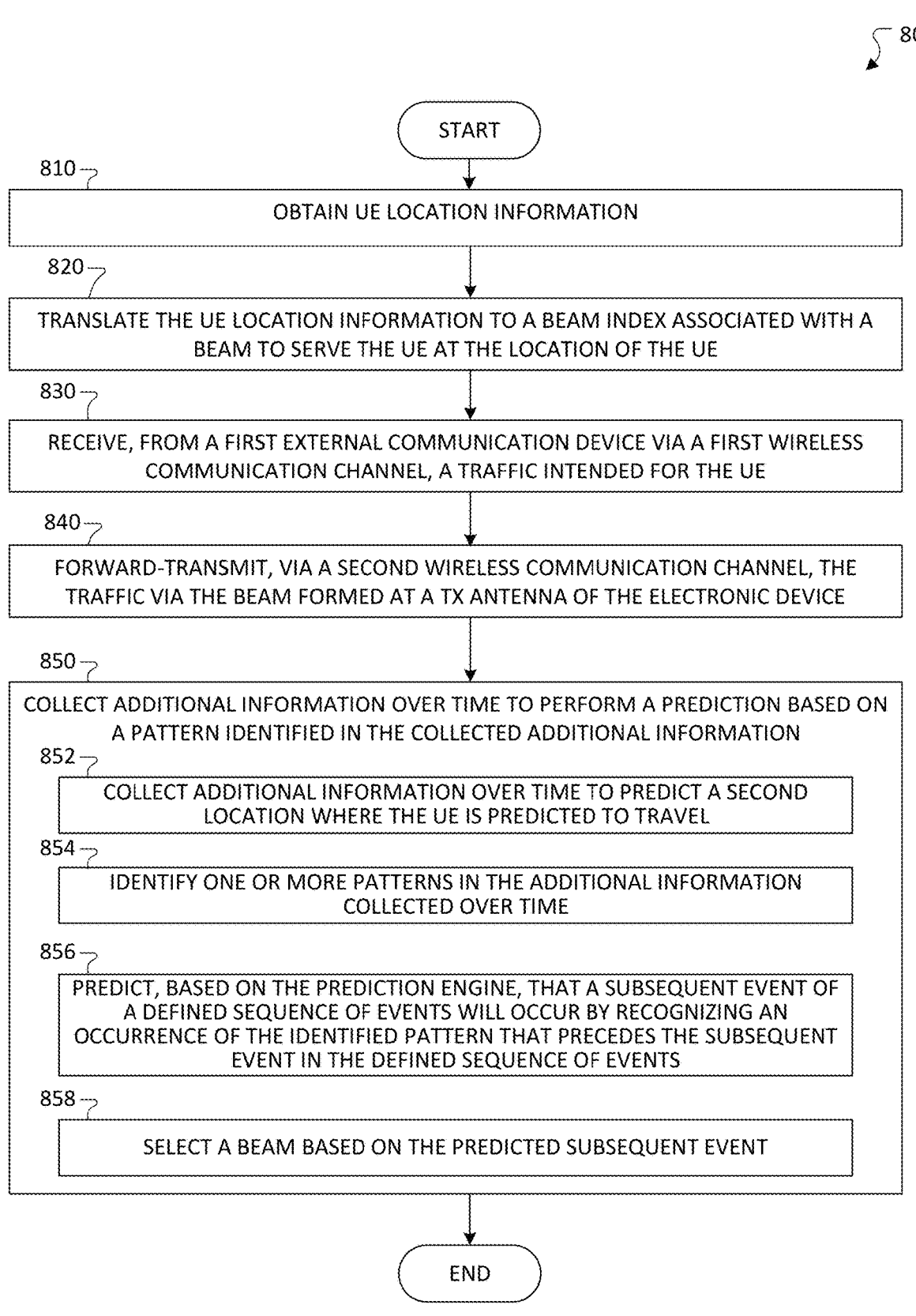
FIG. 8 illustrates a method for positioning based system design for smart repeaters with adaptive beamforming capabilities according to this disclosure.

FIG. 8 illustrates a method 800 for positioning based system design for smart repeaters with adaptive beamforming capabilities according to this disclosure. The embodiment of the method 800 shown in FIG. 8 is for illustration only, and other embodiments could be used without departing from the scope of this disclosure. The method 800 is implemented by an electronic device, such as the smart repeater of 400 of FIG. 4. More particularly, the method 800 could be performed by a processor 425 of the smart repeater of 400. For ease of explanation, the method 800 is described as performed by the processor 425.

At block 810, the processor 425 obtains UE location information. The UE location information indicates the location(s) of one UE or multiple UEs. In some embodiments, the UE location information obtained indicates a location of a specific UE, such as the location of UE1 611 of FIG. 6. In some embodiments, the processor 425 obtains UE location information by receiving a first UE location information indicating a location of a first UE, and receiving a second UE location information indicating a location of a second UE. For example, as shown in the first wing 704 of the layout 700 of FIG. 7, the location of UE1 is transmitted to the first WiFi router 640*a* via the WiFi connection 771 established with the UE1 711, and based that location, the WiFi router 640*a* transmits (via the WiFi connection 742) a first UE location information indicating that the location of the UE1 711 matches a first area of the first wing 704. Additionally, the location of UE2 is transmitted to the first WiFi router 640*a* via the WiFi connection 772 established with the UE2 712, and based that location, the WiFi router 640*a* transmits (via the WiFi connection 742) a second UE location information indicating that the location of the UE2 712 matches a second area of the first wing 704. As another example shown in FIG. 7, the first WiFi router 640*a* can group the first UE location information and the second UE location information into a multi-UE location information, and transmits the multi-UE location information to the first SR 400*a*.

In some embodiments, the processor 425 obtains the UE location information by receiving the UE location information from a WiFi device communicably coupled to the UE, such as a WiFi router 640 of FIG. 6 or WiFi access point. In some embodiments, the SR 400 includes the WiFi router 640 that enables the SR 400 to receive (via WiFi antennas) the UE location information directly from a WiFi device that is the UE.

In some embodiments, the processor 425 obtains the UE location information by receiving the UE location information from the UE via a third wireless communication channel. The third wireless communication channel can use sub-6 GHz frequencies.

At block 820, the processor 425 translates, based on a prediction engine, the UE location information to a beam index associated with the selected beam.

When UE location information is obtained for multiple UEs, the processor 425 additionally translates, based on the prediction engine, the second UE location information to a beam index associated with a beam to serve the second UE at the location of the second UE.

Blocks 830 and 840 show, in response to receiving traffic intended for the UE, the SR 400 forwards the traffic to the UE via the beam associated with the beam index to serve the UE at the location of the UE.

At block 830, the processor 425 controls a transceiver to receive, from an external communication device via a first wireless communication channel, traffic intended for the UE. More particularly, the processor 425 receives the traffic intended for the UE at a at a receive (RX) antenna.

When UE location information is obtained for multiple UEs, the processor 425 additionally receives, from the external communication device via the first wireless communication channel, second traffic intended for the second UE. The traffic intended for the second UE is received at an RX antenna of the SR 400.

At block 840, the processor 425 controls a transceiver to forward-transmit, via a second wireless communication channel, the traffic via the beam formed at a transmit (TX) antenna of the SR 400. The TX antenna of the SR 400 includes an antenna array, and RX antenna of the SR 400 includes another antenna array.

When UE location information is obtained for multiple UEs, the processor 425 additionally forward-transmits, via a third wireless communication channel, the second traffic via the beam formed at a second TX antenna.

At block 850, the processor 425 collects additional information over time to perform a prediction based on a pattern identified in the collected additional information. Block 850 includes blocks 852, 854, 856, and 858.

At block 852, additional data is collected over time in order to make one or more predictions. Particularly, the processor 425 collects additional data over time to predict one or more times when the UE is predicted to be located at a second location. In some embodiments, the processor 425 collects additional data over time to a predict a second location where the UE is predicted to travel. For example, the UE location information can include a time at which the location of the UE is determined.

At block 854, one or more patterns are identified in the additional information collected over time. In some embodiments, the prediction engine identifies the one or more patterns in the additional information collected over time. For example, the prediction engine can identify a pattern that repeatedly when the third UE 523 (i.e., a specific UE) enters the foyer 504 (as indicated by establishing a WiFi connection between UE1 and the SR-embedded WiFi router), the third UE 523 travels to the office 508. As another example, the prediction engine can identify a pattern that at a specified time (e.g., noon) or during a specified window of time (e.g., 12:00 pm-2 pm), multiple UEs are located at a dining hall 512. The prediction engine can identify a pattern that repeatedly UEs associated with guests (as indicated by a UE establishing a connection to a guest WiFi network provided by the SR-embedded WiFi router) travel from the foyer 504 to the meeting room 510 and demand a low or elastic service quality associated with messaging, which is less than a quality of service (QoS) required by an application for online games, streaming media, or voice telephone. The prediction engine can identify a pattern that that UEs associated with workers (as indicated by a UE establishing a connection to a secure WiFi network provided by the SR-embedded WiFi router) who spend time in the creative room 506 repeatedly demand a high or inelastic service quality associated an application for online games, streaming media, video call, or voice telephone.

Once a pattern is identified in the additional information, a reoccurrence of the identified pattern can be recognized. When an occurrence of the identified pattern is recognized, the SR 400 can predict that a sequence of events is currently being repeated, wherein the sequence of events includes the identified pattern followed by a subsequent event. Generally, the processor 425 predicts (at block 856) that a subsequent event of a defined sequence of events will occur by recognizing an occurrence of an identified pattern that precedes the subsequent event in the defined sequence of events; and selects (at block 858) a beam based on the predicted subsequent event.

More specifically, in some embodiments, at block 856, the processor 425 predicts, based on the prediction engine, that another UE will travel to the second location by recognizing an occurrence of the identified pattern. At block 858, the processor 425 selects a beam to serve the other UE at the second location based on the recognized occurrence of the identified pattern. As a continuation of the an above-described scenario in which the identified pattern is that the third UE 523 (i.e., a specific UE) travels to the office 508 after the third UE 523 enters the foyer 504, the processor 425 in this scenario can recognize an entrance of the third UE 523 into the foyer 504 as an occurrence of the identified pattern. More particularly, the processor 425 in this scenario can recognize an establishment of a WiFi connection between the third UE 523 and the SR-embedded WiFi router as an occurrence of the identified pattern. Further, the processor 425 can select the adaptive beam 536 to serve the third UE 523 in the office 508, based on the recognized occurrence of the establishment of the WiFi connection between the third UE 523 and the SR-embedded WiFi router, without using computer processing resources to translate UE location information into a beam index associated with the adaptive beam 536. As continuation of a different above-described scenario in which the identified pattern is that UEs associated with guests demand a lower QoS in the meeting room 510, the processor 425 can select the adaptive beam 538 to serve UEs 525, 526, or 527 located in the meeting room 510, based on recognizing an occurrence of a guest-owned UE establishing a connection to a guest WiFi network. As continuation of another above-described scenario in which the identified pattern is that UEs associated with workers demand a higher QoS in the creative room 506. The demand for the lower QoS may increase the number of UEs that the smart repeater can concurrently serve while maintaining the lower QoS. For ease of explanation, assume that the third wing 708 of FIG. 7 represents the creative room 506 of FIG. 5. The smart repeaters 400e and 400f can select the adaptive beams 730e and 730f to serve UE5 715 and UE6 716 located in the creative room (506, 708), based on recognizing an occurrence of a respective worker-owned UE (715 and/or 716) establishing a connection to a secure WiFi network. The demand for the higher QoS may reduce the number of UEs that the smart repeater can concurrently serve while maintaining the at higher QoS.

More specifically, in some embodiments, at block 856, the processor 425 predicts, based on the prediction engine, that a current location of the UE is the second location based on a current time. At block 858, the processor 425 selects a beam to serve the UE at the second location based on the predicted current location. As a continuation of the above-described scenario in which the identified pattern is that multiple UEs are located at a dining hall 512 during a specified window of time (e.g., 12:00 pm-2 pm), the processor 425 in this scenario can recognize a current time matching the specified window of time as an occurrence of the identified pattern. For ease of explaining this scenario, assume that the first wing 704 of FIG. 7 represents the dining hall 512 of FIG. 5, and that the first SR 400a of FIG. 7 represents the SR 400 of FIG. 5. In which case, the processor 425 can select multiple adaptive beams 730a and 732a associated with the dining hall location (512, 704), based on the recognized occurrence of the current time matching the specified window of time (e.g., lunchtime). That is, the prediction engine enables the SR 400, 400a to select multiple adaptive beams 730a and 732a to serve multiple UEs located in the dining hall (512, 704), which is the predicted current location of the multiple UEs (such as UE1 711 and UE2 712). The processor 425 can perform beam selection without using computer processing resources to translate a multi-UE location information (or both a first UE location information and a second UE location information) into multiple beam indices associated with the adaptive beams 730a and 732a, respectively.

Although FIG. 8 illustrates an example method 800 for positioning based system design for smart repeaters with adaptive beamforming capabilities, various changes may be made to FIG. 8. For example, while shown as a series of steps, various steps in FIG. 8 could overlap, occur in parallel, occur in a different order, or occur any number of times. As a particular example, the SR 400 could receive traffic intended for a UE, and then obtain UE information based on the received traffic.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method implemented by an electronic device, the method comprising:
   obtaining user equipment (UE) location information indicating a location of a UE;
   translating, based on a prediction engine, the UE location information to a beam index associated with a beam to serve the UE at the location of the UE;
   receiving, from an external communication device via a first wireless communication channel, traffic intended for the UE;
   forward-transmitting, via a second wireless communication channel, the traffic via the beam formed at a transmit (TX) antenna of the electronic device;
   collecting additional information over time to predict one or more times when the UE is predicted to be located at a second location;
   identifying a pattern in the additional information collected over time;

predicting, based on the prediction engine, that a current location of the UE is the second location based on a current time; and selecting a beam to serve the UE at the second location based on the predicted current location.

2. The method of claim 1, further comprising:

obtaining a second UE location information indicating a location of a second UE;

translating, based on the prediction engine, the second UE location information to a beam index associated with a beam to serve the second UE at the location of the second UE;

receiving, from the external communication device via the first wireless communication channel, a second traffic intended for the second UE; and forward-transmitting, via a third wireless communication channel, the second traffic via the beam formed at a second TX antenna.

3. The method of claim 1, wherein obtaining the UE location information comprises receiving the UE location information from a WiFi device communicably coupled to the UE.

4. The method of claim 1, wherein obtaining the UE location information comprises receiving the UE location information from the UE via a third wireless communication channel.

5. The method of claim 1, wherein:

receiving the traffic comprises receiving the traffic at a receive (RX) antenna; and the TX antenna includes an antenna array, and RX antenna includes another antenna array.

6. The method of claim 1, further comprising:

collecting additional information over time to predict the second location where the UE is predicted to travel;

identifying a second pattern in the additional information collected over time;

predicting, based on the prediction engine, that another UE will travel to the second location by recognizing an occurrence of the identified second pattern; and selecting a beam to serve the other UE at the second location based on the recognized occurrence of the identified second pattern.

7. The method of claim 1, further comprising:

collecting additional information including: a sequence of events that includes one or more events followed by a subsequent event, and a respective time of occurrence of each among the sequence of events;

identifying the one or more events as the pattern that precedes the subsequent event, the subsequent event including travel of the UE from a first location associated with the pattern to the second location;

predicting that the current location of the UE is the second location based on an occurrence of the identified pattern that is recognized as the sequence of events being repeated before the current time; and selecting a beam to serve the UE at the second location based on the predicted current location, wherein the location of the UE is relative to a location of the electronic device.

8. An electronic device comprising:

a transceiver; and a processor operably connected to the transceiver and configured to:

obtain user equipment (UE) location information indicating a location of a UE;

translate, based on a prediction engine, the UE location information to a beam index associated with a beam to serve the UE at the location of the UE;

receive, from an external communication device via a first wireless communication channel, traffic intended for the UE;

forward-transmit, via a second wireless communication channel, the traffic via the beam formed at a transmit (TX) antenna of the electronic device;

collect additional information over time to predict one or more times when the UE is predicted to be located at a second location;

identify a pattern in the additional information collected over time;

predict, based on the prediction engine, that a current location of the UE is the second location based on a current time; and select a beam to serve the UE at the second location based on the predicted current location.

9. The electronic device of claim 8, wherein the processor is further configured to:

obtain a second UE location information indicating a location of a second UE;

translate, based on the prediction engine, the second UE location information to a beam index associated with a beam to serve the second UE at the location of the second UE;

receive, from the external communication device via the first wireless communication channel, a second traffic intended for the second UE; and forward-transmit, via a third wireless communication channel, the second traffic via the beam formed at a second TX antenna.

10. The electronic device of claim 8, wherein to obtain the UE location information, the processor is further configured to receive the UE location information from a WiFi device communicably coupled to the UE.

11. The electronic device of claim 8, wherein to obtain the UE location information, the processor is further configured to receive the UE location information from the UE via a third wireless communication channel.

12. The electronic device of claim 8, wherein:

to receive the traffic, the processor is further configured to receive the traffic at a receive (RX) antenna; and the TX antenna includes an antenna array, and RX antenna includes another antenna array.

13. The electronic device of claim 8, the processor is further configured to:

collect additional information over time to predict the second location where the UE is predicted to travel;

identifying a second pattern in the additional information collected over time;

predict, based on the prediction engine, that another UE will travel to the second location by recognizing an occurrence of the identified second pattern; and select a beam to serve the other UE at the second location based on the recognized occurrence of the identified second pattern.

14. The electronic device of claim 8, wherein the processor is further configured to:

collect additional information including: a sequence of events that includes one or more events followed by a subsequent event, and a respective time of occurrence of each among the sequence of events;

identify the one or more events as the pattern that precedes the subsequent event, the subsequent event including travel of the UE from a first location associated with the pattern to the second location;

predict that the current location of the UE is the second location based on an occurrence of the identified pattern that is recognized as the sequence of events being repeated before the current time; and select a beam to serve the UE at the second location based on the predicted current location, wherein the location of the UE is relative to a location of the electronic device.

15. A non-transitory computer readable medium embodying a computer program, the computer program comprising computer readable program code that, when executed by a processor of an electronic device, causes the electronic device to:

obtain user equipment (UE) location information indicating a location of a UE;

translate, based on a prediction engine, the UE location information to a beam index associated with a beam to serve the UE at the location of the UE;

receive, by a transceiver, from an external communication device via a first wireless communication channel, traffic intended for the UE;

forward-transmit, by the transceiver, via a second wireless communication channel, the traffic via the beam formed at a transmit (TX) antenna of the electronic device;

collect additional information over time, wherein the additional information is collected to at least one of:

predict a second location where the UE is predicted to travel; or predict one or more times when the UE is predicted to be located at a second location;

identify a pattern in the additional information collected over time;

predict, based on the prediction engine, at least one of:

that another UE will travel to the second location by recognizing an occurrence of the identified pattern; or that a current location of the UE is the second location based on a current time; and select a beam to serve the other UE at the second location based at least one of:

the recognized occurrence of the identified pattern; or the predicted current location.

16. The non-transitory, computer readable medium of claim 15, wherein the program code that, when executed, causes the electronic device to:

obtain a second UE location information indicating a location of a second UE;

translate, based on the prediction engine, the second UE location information to a beam index associated with a beam to serve the second UE at the location of the second UE;

receive, by the transceiver, from the external communication device via the first wireless communication channel, a second traffic intended for the second UE; and forward-transmit, by the transceiver, via a third wireless communication channel, the second traffic via the beam formed at a second TX antenna.

17. The non-transitory, computer readable medium of claim 15, wherein the program code that, when executed, causes the electronic device to obtain the UE location information further comprises program code that, when executed, causes the electronic device to:

receive the UE location information from a WiFi device communicably coupled to the UE.

18. The non-transitory, computer readable medium of claim 15, wherein the program code that, when executed, causes the electronic device to obtain the UE location information further comprises program code that, when executed, causes the electronic device to:

receive the UE location information from the UE via a third wireless communication channel.

19. The non-transitory, computer readable medium of claim 15, wherein:

the program code that, when executed, causes the electronic device to receive the traffic further comprises program code that, when executed, causes the electronic device to receive the traffic at a receive (RX) antenna; and the TX antenna includes an antenna array, and RX antenna includes another antenna array.

20. The non-transitory, computer readable medium of claim 15, wherein the program code that, when executed, causes the electronic device to:

collect, as the additional information to predict the second location where the UE is predicted to travel: a sequence of events that includes one or more events followed by a subsequent event, and a respective time of occurrence of each among the sequence of events;

identify the one or more events as the pattern that precedes the subsequent event, the subsequent event including travel of the UE from a first location associated with the pattern to the second location;

predict that the current location of the UE is the second location based on an occurrence of the identified pattern that is recognized as the sequence of events being repeated before the current time; and select a beam to serve the other UE at the second location based on the predicted current location, wherein the location of the UE is relative to a location of the electronic device.

* * * * *